United States Patent Office 3,766,110
Patented Oct. 16, 1973

3,766,110
SOLVENT-FREE PRINTING INKS
Joseph G. Curado, Rutherford, and Redento R. Rampo, Wood-Ridge, N.J., assignors to Sun Chemical Corporation, New York, N.Y.
No Drawing. Continuation-in-part of abandoned application Ser. No. 652,405, July 11, 1967. This application May 13, 1968, Ser. No. 728,778
Int. Cl. C08g 17/16, 39/00
U.S. Cl. 260—26
9 Claims

ABSTRACT OF THE DISCLOSURE

A solvent-free thermosetting ink composition comprises (1) a mixture of at least two of the following: an unsaturated monomer, a prepolymer, and a polymer, (2) an inhibitor, and/or (3) a catalyst as required by the system with or without a colorant.

---

This application is a continuation-in-part of copending application Ser. No. 652,405 (filed July 11, 1967), now abandoned.

This invention relates to printing inks. More particularly it relates to the production of solvent-free thermosetting inks for high-speed publication presses.

The need for printing inks that can be changed quickly from the fluid to the solid state has been widely recognized. To date, however, the only practical system that has evolved is the heat-set inks currently widely used. The vehicles used are solutions of various resins in petroleum solvents of high boiling ranges, e.g., 410° F. to 595° F. These are relatively non-volatile at room temperature so that they provide reasonable stability on the press and yet will evaporate quite rapidly in thin films at temperatures of 350° F. or higher.

On presses equipped with adequate ovens, e.g., direct flame, high velocity hot air, or high pressure steam drums, these inks have made possible speeds upwards of 2000 feet per minute. In spite of this advantage, such inks have several serious inherent drawbacks. No oven currently available completely burns the solvent oils driven off the printed ink. The inks contain from about 30 to 50 percent by weight of these solvents, and only a small fraction of this is burned. The major part of this solvent is carried in the vapor phase through the exhaust system. On reaching cooler parts of the equipment, it is prone to condense.

The fraction that is incompletely burned forms resinous and tarry fractions that foul up the ovens; in addition, some of the relatively unchanged vapor condenses on chill rolls, causing unsightly oil streaks on the printed product. The balance goes through the exhaust system where some condenses, causing oil drips and serious fire hazards; the rest is discharged into the surrounding air, causing severe pollution problems. With such pollution coming under scrutiny by municipal, state, and federal agencies, its elimination becomes mandatory.

In accordance with this invention, there is provided a solvent-free printing ink that quickly converts from the liquid to the solid state through a crosslinking mechanism without the liberation of undesirable compounds as disclosed above. Such ink systems comprise (1) mixtures of two or more relatively low-viscosity thermosetting unsaturated monomers, prepolymers, or polymers; (2) an inhibitor to provide extended shelf-life as required by the system; and (3) if necessary, a catalyst to promote conversion to the solid state in the presence or absence of a thermally activated resin dissolved therein if the system so warrants.

The monomers used in the compositions of this invention are unsaturated and include, for example, allyl esters, such as for example diallyl phthalate, diallyl maleate, triallyl phosphate, and triallyl cyanurate; styrenes, such as for example styrene, α-methylstyrene, and dichlorostyrene; vinyl toluene; acrylates and methacrylates, such as for example methyl methacrylate, 2-ethyl-hexyl acrylate, and dibutylacrylate; maleates, such as for example diethyl maleate, dibutyl maleate, and dioctyl maleate; fumarates, such as for example diethyl fumarate, dibutyl fumarate, and dioctyl fumarate; divinylbenzene; and the like; and their mixtures. Also suitable for use in this invention are the prepolymers of these monomers, that is, their dimers, trimers, and other oligomers, and mixtures of these.

Suitable polymers include saturated and unsaturated polyesters; oil-modified polyesters; rosin-modified polyesters; rosin-oil-modified polyesters; alkyd resins; allyl resins; polyethers, such as epoxy resins, e.g., those prepared by reacting a polyhydric phenol such as bisphenol A (a mixture of 4,4'-dihydroxydiphenyldimethyl methane with lesser quantities of its 2,2'- and its 4,2'-isomers) with epichlorohydrin; amino resins, such as urea formaldehyde resins, melamine formaldehyde resins, triazine formaldehyde resins, alkylated amino resins, e.g., butylated amino resins, and etherified amino resins, e.g., methoxy amino resins; and the like; and mixtures and copolymers thereof.

Polyhydric alcohols which can be used in the preparation of the polyesters include ethylene glycol, propylene glycol, neopentyl glycol, butylene glycol, hexanetriol, diethylene glycol, dipropylene glycol, glycerol, pentaerythritol, dipentaerythritol, trimethylolethane, trimethylolpropane, sorbitol, and the like, and their mixtures. The polycarboxylic acids and anhydrides which can be used in the preparation of the polyesters may be aliphatic or aromatic and include maleic, fumaric, phthalic, isophthalic, terephthalic, itaconic, succinic, adipic, malonic, pimelic, citric, tetrahydrophthalic, sebacic, azelaic, and dimer acids, and the like, their anhydrides, and mixtures thereof. Specific examples of suitable polyesters include, but are not limited to, glycol phthalate, glycol maleate, glycol fumarate, glycol phthalate/maleate, glycerol maleate, glycerol phthalate/maleate, glycerol itaconate, pentaerythritol maleate, pentaerythritol phthalate, pentaerythritol itaconate, pentaerythritol fumarate, trimethylolethane maleate, trimethylolpropane fumarate, and so forth, and mixtures of these.

The catalyst may be used in an amount ranging from 0 up to about 10 percent, based on the weight of the resin mixture. Suitable catalysts include organic peroxides, metal driers, organic and inorganic acids, and the like, and mixtures thereof. Specific examples of suitable catalysts include phosphoric acid; hydrochloric acid; sulfonic acids, such as p-toluene sulfonic acid; lactic acid; oxalic acidic; maleic, fumaric, phthalic, succinic, and the like, acids and anhydrides; oxygen; ozone; peroxides, such as hydrogen peroxide, acetyl peroxide, benzoyl peroxide, and lauroyl peroxide; perborates; percarbonates; metal driers, such as the naphthenates, linoleates, resinates, octoates, acetates, borates, oxalates, and the like, of cobalt, manganese, cerium, and lead; amines; amine salts, such as the triethanolamine salt of sulfonic acid; and the like; and mixtures thereof.

The use of an inhibitor in the present solvent-free heat-setting inks is important. During the printing operation the inhibitor keeps the ink fluid; the inhibitor then evaporates; and the higher boiling catalyst, which may be added to the system or inherent in it, takes over to cure, that is, to harden, the system. In general the inhibitor has a boiling point between about 260° and 500° F., preferably about 260° F., and is present in an amount ranging from about 1 to 2 percent, preferably about 1.2 percent, based on the stoichiometric amount required to neutralize the catalyst or the acidity of the resin, pigments, or other components in the ink. Specific compounds that are suitable as inhibitors include the mercaptans and their derivatives, e.g., glycol mercaptoacetate and ethyl mercaptoacetate; tertiary aliphatic amines, e.g., triethanolamine and t-butyldiethanolamine: morpholine; n-amino morpholine; n-amino ethylmorpholine; n-amino propylmorpholine; amine oxides, e.g., bis (2-hydroxyethyl) cocoamine oxide and bis (2-hydroxyethyl) octadecylamine oxide; cyclicized unsaturated aromatic hydrocarbons, e.g., neohexene, cyclohexene, cyclooctene, and d-limonene; and the like; and mixtures thereof.

It is to be understood that conventional black or colored colorants, either pigments or dyes, may be used in conventional quantities in the ink formulations of this invention. Suitable dyes include methylene blue, aniline dyes, alizarine red, auramin naphthol, malachite green, and the like. Suitable pigments include carbon black, zinc oxide, titanium dioxide, phthalocyanine blue, phthalocyanine green, benzidine yellow, mansa yellow, naphthol yellow lake, cadmium orange, chrome yellow, Prussian blue, bronze blue, chrome green, peacock blue lake, monastral blue, red lake C, para red, toluidine red, barium lake red C, sodium lithol red, barium lithol red, lithol rubine, molybdated scarlet chrome, ferric oxide, aluminum hydrate, and the like. For example, the resin mixture may be used in an amount ranging from about 70 to 90 percent of the ink weight and a colorant from about 10 to 30 percent of the ink weight.

Other commonly known modifiers can be incorporated into the printing inks of the present invention. These include plasticizers; wetting agents for the colorant, such as triethanolamine; leveling agents, such as lanolin, paraffin waxes, and natural waxes such as ceresin wax and carnauba wax; and the like. Such modifiers are generally used in amounts ranging from 0 to about 5 percent by weight, preferably about 2 to 3 percent, based on the weight of the resin.

Drying oil binders, such as soybean oil; linseed oil; tung oil, oiticica oil; tall oil; oil-modified alkyd, phenolic, and maleic resins; and the like may also be included in the present printing inks in amounts ranging from about 5 to about 60, preferably about 10 to 30 percent, based on the weight of the wet ink.

The ink formulations of this invention may be prepared in any convenient manner, for example, in a three-roll mill, a sand mill, a ball mill, a colloid mill, or the like, in accordance with known ink-making techniques.

In one specific embodiment of this invention, a saturated polyester is dissolved into an unsaturated monomer, resulting in a vehicle which will carry pigment and which will, upon the application of heat, harden. This hardening presumably is caused by the homopolymerization of the unsaturated monomer; if desired, activated with a catalyst and/or accelerator or inhibited with an inhibitor. The saturated polyester incorporates into the ink system the desired pigment wetting, printability, and rheological properties.

In another embodiment, three reactive materials are combined, e.g., an epoxy resin, an amino resin, and an unsaturated monomer. Upon thermal activation, these components crosslink into a hard, three-dimensional polymer. It is believed that the epoxy resin crosslinks with the amino resin and the unsaturated monomer to impart hardness and rub resistance to the cured system. The monomer acts as a reactive viscosity modifier; it both homopolymerizes and copolymerizes with the epoxy resin to form a tough, hard film.

A further embodiment involves dissolving an amino resin itno an unsaturated polyester which contains sufficient —OH and —COOH groups to result in a system which, upon thermal activation, polymerizes through condensation and Diels-Alder reactions. The amino resin can homopolymerize and also copolymerize by condensation with the polyester; it gives to the system the desired pigment wetting, printability, and rheological properties. The polyester carries the amino resin and cures through condensation copolymerization. Further polymerization is then possible through the double bonds (Diels-Alder reaction). Acid accelerators, metal accelerators, peroxide catalysts, and the like may be added if desired to speed up the rate of cure.

If the system is reactive and hence has poor shelf life, this may be controlled by the addition of a suitable inhibitor. For example, a formulation could include the above-mentioned combination of resins plus an acid catalyst and an amine inhibitor. To prevent premature gelation due to a Diels-Alder effect, an antioxidant may be added. Suitable antioxidants include phenols, substituted phenols, aromatic amines, and salts and condensation products of amines and aminophenols with aldehydes, ketones, and thio compounds, e.g., eugenol and ionol.

To obtain optimum properties, stoichiometric proportions of, for example, the polyester and the amino resin are preferred. Since, however, there are steric hindrances and so forth in reactions between large molecules, there is usually an excess of one component plus some amount of homopolymer. The proper balance thus must be arrived at by experimentation.

Additional embodiments include thermosetting combinations of polyester, amino resin, and unsaturated monomer; polyester and epoxy resin; epoxy resin and unsaturated monomer; amino resin and unsaturated monomer; two or more polyesters; and the like, in the presence of an inhibitor and/or a catalyst.

By practice of this invention there is obtained a solvent-free thermosetting printing ink which is particularly suitable for use on high-speed publication presses. The ink composition has outstanding pot life. The resulting heat-set ink film, when completely cross-linked and cured, possesses excellent print quality, dry rub resistance, and grease resistance that are superior to the properties obtained with conventional solvent-type inks.

The invention will be more fully understood by reference to the following examples which are not intended to limit the scope of the invention except as indicated by the appended claims. Unless otherwise specified, all parts are given by weight.

EXAMPLE I

A saturated polyester (prepared by the reaction of a polyhydric alcohol with a polyfunctional acid) (32.25 parts) and 32.25 parts of diallyl phthalate were mixed, heated to 222° F., and cooled to 80° F. Diallyl phthalate (16.15 parts), 16.15 parts of carbon black, and 3.2 parts of alkali blue base were added to the polyester mixture, and the composition was milled by known ink-making technique.

The resulting ink was tested by printing at 1000 feet per minute on a high speed web press and heat set. The oven is a conventional type using gas and ribbon burners. Gas consumption was in the range usually required for normal solvent-based heat-set inks. The ink was dry and showed no offset.

EXAMPLE II

Isobutylated urea formaldehyde resin (27.6 parts), 18.8 parts of an epoxy resin (a bisphenol A type epoxy, epoxide equivalent=190–210), 28.6 parts of diallyl phthalate, 16.0 parts of carbon black, 4.5 parts of Milori Blue pigment, 1.8 parts of 6 percent cobalt drier, and 2.7 parts of isopropyl phosphate were milled ten times on a three-roll mill to evaporate the alcohol in the amino resin.

The resulting ink was tested by printing at 1200 feet per minute as in Example I. The ink was dry and did not offset.

EXAMPLE III

A mixture of 19.5 parts of a varnish consisting of a 1:2 mixture of a polyol maleate and a urea formaldehyde resin having 50 percent solids, 43.5 parts of a polyol maleate, 2.2 parts of dibutyl phthalate and 2.2 parts of dihexyl phthalate to adjust viscosity, 2.2 parts of micro-pulverized carnauba wax and 3.2 parts of finely-divided polyethylene to impart slip, 21.7 parts of carbon black, and 5.5 parts of Milori Blue was milled in a conventional three-roll mill to evaporate the solvent in the urea formaldehyde resin.

The resulting ink formed a flexible, hard tough film upon baking for 15 seconds at 450° F.

EXAMPLE IV

A urea formaldehyde resin (8 parts), 61 parts of a polyol maleate, 0.2 part of p-toluene sulfonic acid as catalyst, 3 parts of dihexyl phthalate as plasticizer, 18 parts of carbon black, and 9 parts of Milori Blue were milled on a conventional three-roll mill.

The resulting ink printed at 1200 feet per minute on a web press and heat set with four burners (500 cubic feet of gas). The resulting print was sharp, possessed good finish, showed no offset, and had very slight soft top.

EXAMPLE V

An ink formulation consisting of 8 parts of a urea formaldehyde resin, 62 parts of a polyol maleate, 0.2 part of p-toluene sulfonic acid, 1 part of 6 percent cobalt drier, 3 parts of t-butyl peroxide, 18 parts of carbon black, 9 parts of Milori Blue, and 2 percent of dihexyl phthalate to adjust the viscosity was milled on a conventional three-roll mill.

The resulting ink printed well at 1200 feet per minute on a web press and heat set to a dry, tough, rub-resistant film. The printing was sharp and clean, and the finish was good.

EXAMPLE VI (A) A mixture of 29 parts of melamine formaldehyde resin, 26 parts of trimethylolpropane maleate, 26 parts of trimethylolpropane fumarate, 2 parts of blown linseed oil, 1.5 parts of p-toluene sulfonic acid, 12 parts of furnace black, and 6 parts of Milori Blue were milled on a conventional three-roll mill.

(B) The procedure of part (A) was repeated except that the mixture also contained 1.5 percent of morpholine.

(C) The viscosity of each of the printing inks prepared in parts (A) and (B) was measured (1) without heating or standing, (2) after heating in an oven at 46° C. for two days, and (3) after heating in an oven at 46° C. for five days. The results are tabulated below.

TABLE I

|  | Viscosity, poises of— | |
| --- | --- | --- |
|  | Ink (A) | Ink (B) |
| (1) | 61 | 48 |
| (2) | 115 | 57 |
| (3) | 317 | 128 |

From these data it can be seen that ink (B) containing morpholine had after five days of heating a viscosity less than half of that of uninhibited ink (A), indicating that ink (B) had been stabilized.

After being aged at room temperature for three months, ink (B) was printable at 1200 feet per minute and retained a viscosity of 50 poises.

EXAMPLE VII

The procedures of Example VI (A, B, and C) were repeated except that channel black was used instead of furnace black. The results are tabulated below.

TABLE II

|  | Viscosity, poises of— | |
| --- | --- | --- |
|  | Ink (A) | Ink (B) |
| (1) | 58 | 49 |
| (2) | 140 | 61 |
| (3) | 415 | 125 |

These data indicate the beneficial effect of an inhibitor on the shelf life of a printing ink.

EXAMPLE VIII

An ink formulation containing 29 parts of a melamine formaldehyde resin, 26 parts of trimethylolethane maleate, 26 parts of trimethylolethane fumarate, 1 part of d-limonene, 12 parts of channel black, and 6 parts of Milori Blue was milled on a conventional three-roll mill.

The resulting print had excellent quality, dry rub resistance, and grease resistance.

EXAMPLE IX

An ink consisting of 29 parts of a melamine formaldehyde resin, 26 parts of trimethylolpropane maleate, 26 parts of trimethylolpropane fumarate, 2 parts of blown linseed oil, 1 part of morpholine, and 16 parts of phthalocyanine green was prepared on a conventional three-roll mill.

The ink had excellent shelf life; it printed well at 1200 feet per minute on a web press and heat set with four burners. The resulting print was sharp and its dry rub and grease resistance excellent.

EXAMPLE X

The procedure of Example VI(B) was repeated except that instead of morpholine each of the following was used as the inhibitor: glycol mercaptoacetate, t-butyldiethanolamine, triethanolamine, n-amino morpholine, n-amino propylmorpholine, neohexene, cyclooctene, bis (2-hydroxyethyl) cocoamine oxide, bis (2-hydroxyethyl) octadecylamine oxide, d-limonene, and cyclohexene. The results were comparable.

EXAMPLE XI

The procedure of Example VI(B) was repeated except that instead of p-toluene sulfonic acid each of the following was used as the catalyst: phosphoric acid, hydrochloric acid, maleic anhydride, fumaric anhydride, phthalic anhydride, cobalt naphthenate, manganese octoate, lauroyl peroxide, benzoyl peroxide, and the triethanolamine salt of sulfonic acid. The results were comparable.

EXAMPLE XII

An ink consisting of 72 parts of a 50/50 mixture of urea formaldehyde resin and glycerol fumarate, 2 parts of monoethanolamine as inhibitor, 1 part of hydrochloric acid as catalyst, and 25 parts of iron blue pigment was prepared on a conventional three-roll mill.

After being aged for three months at room temperature, the ink was printable at 1200 feet per minute.

EXAMPLE XIII

The procedure of Example XII was repeated except that the amino resin was triazine formaldehyde instead of urea formaldehyde. The results were comparable.

EXAMPLE XIV

An ink consisting of 78 parts of a 25/75 mixture of a low melting high acid number (minimum 350) rosin-modified polyol maleate resin dissolved in a melamine formaldehyde resin, 2 parts of triethanolamine as inhibitor, and 20 parts of carbon black was prepared on a conventional three-roll mill.

After being aged for three months at room temperature, the ink was printable at 1200 feet per minute.

EXAMPLE XV

The procedure of Example XIV was repeated except that the resin was a low melting rosin-modified fumaric resin having an acid number above about 350 dissolved in a melamine formaldehyde resin. The results were comparable.

EXAMPLE XVI

The procedures of Examples I, II, III, IV, and V were repeated except that the ink formulations each contained 1.5 percent of morpholine. After being aged at room temperature for two months, the stabilized inks were printable at 1200 feet per minute and retained their original viscosities.

EXAMPLES XVII

The procedure of Example VI(B) was repeated except that butylated melamine formaldehyde resin was used instead of melamine formaldehyde resin. The results were comparable.

EXAMPLES XVIII

The procedure of Example VI(B) was repeated except that methoxy melamine formaldehyde was used instead of melamine formaldehyde resin. The results were comparable.

As will be evident to those skilled in the art, various modifications of this invention may be made in the light of the foregoing disclosure without departing from the spirit or scope thereof.

What is claimed is:

1. An ink composition free of volatile solvents and consisting essentially of (1) an amino resin selected from the group consisting of urea formaldehyde resin, isobutylated urea formaldehyde resin, triazine formaldehyde resin, melamine formaldehyde resin, butylated melamine formaldehyde resin, and methoxy melamine formaldehyde resin; (2) a polyester selected from the group consisting of a maleate of an aliphatic dihydric, trihydric, or tetrahydric alcohol; a fumarate of an aliphatic dihydric, trihydric, or tetrahydric alcohol; and mixtures of said maleate and fumarate; (3) an inhibitor; and (4) 0 to about 10 percent of a catalyst.

2. The composition of claim 1 which additionally contains at least one colorant.

3. The composition of claim 1 wherein the polyester is a maleate.

4. The composition of claim 1 wherein the polyester is a fumarate.

5. The composition of claim 1 wherein the polyester is a mixture of a maleate and a fumarate.

6. The composition of claim 1 wherein the amino resin is a melamine formaldehyde resin, the polyester is a mixture of a maleate and a fumarate, and the inhibitor is morpholine.

7. The composition of claim 1 wherein the amino resin is a melamine formaldehyde resin, the polyester is a mixture of maleate and fumarate, the inhibitor is morpholine, and the catalyst is p-toluene sulfonic acid.

8. The composition of claim 1 wherein the amino resin is a melamine formaldehyde resin and the polyester is a rosin-modified maleate.

9. The composition of claim 1 wherein the amount of inhibitor is within the range of about 1 to 2 percent, based on the weight of the total composition.

References Cited

UNITED STATES PATENTS

| | | | |
|---|---|---|---|
| 2,292,468 | 8/1942 | Deffinger et al. | 260—26 |
| 2,486,235 | 10/1949 | Watt | 260—850 |
| 3,106,550 | 10/1963 | Bitting et al. | 260—26 |
| 3,254,039 | 5/1966 | Burrell et al. | 260—850 |
| 3,272,640 | 9/1966 | Geurden | 260—850 |
| 3,309,327 | 3/1967 | Gayer | 260—850 |
| 2,851,429 | 9/1958 | Petropoulus | 260—850 |
| 3,317,474 | 5/1967 | Jones | 260—850 |
| 3,506,621 | 4/1970 | Fukushing et al. | 260—850 |
| 3,547,846 | 12/1970 | Coulrer | 260—21 |

DONALD E. CZAJA, Primary Examiner

W. E. PARKER, Assistant Examiner

260—21, 834, 836, 850, 864

U.S. Cl. X.R.